3,535,172
Patented Oct. 20, 1970

3,535,172
ROCKET PROPELLANTS CONTAINING COATED NITRONIUM PERCHLORATE
Herman Bieber, Kenilworth, and Julian Lakritz, Rahway, N.J., assignors to Esso Research and Engineering Company, a corporation of Delaware
No Drawing. Filed Mar. 18, 1960, Ser. No. 16,008
Int. Cl. C06d 5/00
U.S. Cl. 149—7   14 Claims The present invention relates to a coated oxidizer useful in rocket propellant compositions, and the method of coating said oxidizer. More particularly, the invention concerns coating a stable form of nitronium perchlorate with an organic or inorganic substance that is impervious to molecules that react with said nitronium perchlorate and utilizing the coated nitronium perchlorate in a rocket propellant.

Prior to the present invention nitronium perchlorate (NPS) was made in the liquid phase from nitrogen tetroxide and anhydrous perchloric acid in nitromethane and it could not be coated or encapsulated with metals, e.g. aluminum, or polymers, e.g. polyethylene, because of its unstable and explosive nature. Thus, it had no practical application in solid propellants wherein the fuel and oxidizer are mixed.

It has now been discovered that nitronium perchlorate prepared in the gas phase from nitrogen oxides and chlorine oxides is highly stable and relatively non-reactive with coating substances, such as metals and high molecular weight organic compounds and polymers. This unexpected stability of a heretofore dangerous chemical is attributed at least in part to the absence of perchloric acid which is present in material made by the well known liquid phase process. The relatively insensitive NPC employed in the present invention is prepared by reacting inorganic oxides of nitrogen, especially nitrogen dioxide and its dimer nitrogen tetroxide, with chlorine oxide in the gas phase. The nitrogen oxides may be used either alone or in admixture with ozonized air or oxygen. Ozonized oxygen is preferred when nitrogen oxides are added to the reaction zone because the efficiency of converting pure oxygen to ozone is greater than converting the oxygen in the air to ozone. If no nitrogen oxide is used, ozonized air must be used to provide nitrogen to the system.

In preparing NPC, chlorine oxide is reacted with nitrogen oxide and usually ozone in the gas phase at temperatures of —20° C. to 50° C., preferably 10 to 35° C., and under pressures of 0 to 100 p.s.i.g. Where the reactants are pentoxide and chlorine trioxide, ozone is not necessary; however, if lower oxides are used, e.g. nitrogen tetroxide, ozone must be used. The nitrogen oxide, chlorine oxide and ozone, when used, are introduced into a reaction zone in proportions which favor the highest yield of perchlorate. The reaction zone should have facilities for permitting the removal of solid NPC product and the withdrawal of gaseous materials comprising mainly unreacted substances which can be recycled to the reaction zone. The term "chlorine oxide" as used herein means an inorganic chlorine compound containing 2 or 3 oxygen atoms.

A specific method for making the oxidizer used in the present invention involves adding chlorine dioxide and nitrogen tetroxide to an ozone stream and allowing the resulting mixture to react in the gas phase at —20° to 50° C., preferably 10° to 35° C., for from a couple of seconds to several minutes under pressures of 0 to 100 p.s.i.g. In general, about 0.25 to 0.75 mole of nitrogen tetroxide is contacted with about 0.25 to 0.75 mole of chlorine dioxide or chlorine trioxide and 2 moles of ozone for from 0.01 second to several minutes, preferably for about 2 seconds to about a minute. If ozonized air is introduced into the reaction zone, less nitrogen dioxide or its dimer is needed since the ozonized air contains some nitrogen pentoxide which reacts to form the desired product.

In another method, substantially stoichiometric amounts of ozonized oxygen, nitrogen tetroxide and chlorine are passed into an irradiated reaction zone, which is maintained at approximately ambient temperature and atmospheric pressure, and wherein the gaseous reactants combine to form solid nitronium perchlorate. If desired, the chlorine may be passed through an irradiated zone with ozone prior to being introduced in the reaction zone, in which case the reaction zone need not be irradiated. Any suitable irradiating source, such as ultraviolet light or ionizing radiation, e.g. gamma rays, may be used. If gamma radiation is employed the dosage used should be at least $1 \times 10^4$ rads./hour but not more than $1 \times 10^8$ rads./hour. The solid product may be removed by continually shaking the solid to the bottom of the reaction zone and continually withdrawing at least a portion of it from said zone. The unreacted gases may be recycled to the reaction zone. The nitrogen tetroxide feed should be adjusted to just below the level at which the exhaust gases have a brownish color. If this color occurs in the gases leaving the reaction zone it is an indication that an excess of nitrogen tetroxide is present in the reaction zone and its flow rate should be adjusted downward until no more brownish gas is detected.

It is believed that the chlorine and ozone react when properly initiated, for instance by U.V. irradiation, to form chlorine dioxide and/or chlorine trioxide. The chlorine readily reacts with the ozone and thus the exposure time need not exceed 5 or 6 minutes, about ½ second to 2 minutes being generally satisfactory, when a 100 watt quartz ultraviolet light source is used. This process is preferred because the raw materials are relatively inexpensive and it avoids the handling of chlorine dioxide which is a dangerous reactant.

The reaction should be carried out under substantially anhydrous conditions. Thus reactants and the reaction zone employed in the preparation of the perchlorate product must be essentially free of water.

The ozone used in the preparation of nitronium perchlorate may be obtained by passing oxygen or air through a suitable ozonizer, such as one operating on 60 cycles and 14,000 volts at 0° C. Where oxygen is used the ozone should be diluted with a gas, such as oxygen or nitrogen, to avoid uncontrolled reactions which lead to explosions. The ozone-containing gas may safely contain up to 10 wt. percent ozone. Of course, there should be a minimum of 0.01% ozone in the gas to insure a rapid reaction.

Nitronium perchlorate prepared in accordance with the above methods is a white solid having a density of about 2.2 g./cc., a decomposition temperature of about 120° C. and a shock sensitivity of >90 kg. in. While it is not highly shock sensitive as is NPC prepared by the other methods, it is highly reactive when brought into contact with benzene and other aromatic or olefinic hydrocarbons. It reacts with benzene to make nitrobenzene which can be used to make aniline. If it is used as an oxidizing or nitrating agent, it should be diluted with a halogenated or nitrate solvent. Moreover, because it is an excellent oxidizing agent, its insensitivity to shock makes it highly desirable for use in solid rocket propellant systems.

The NPC prepared by any of the above-described methods may be coated with a substance which prevents it from decomposing or prematurely reacting when it is admixed with other chemicals. For instance, if the perchlorate product is not stored in a dry atmosphere, it is necessary to employ a coating substance that is impervious to moisture. In other situations it is desirable to provide a barrier between the oxidizer and the fuel so that the two materials can be stored for extensive periods of time. In such cases the solid oxidizer may be coated with high molecular weight substances, such as polyvinyl chloride, Saran, polyethylene, polypropylene, paraffin wax, silicones, fluorinated polymers and other organic coating materials. The foregoing substances may be applied to the surface of the oxidizer by melting them and admixing the melted substance with discrete particles of NPC or admixing the oxidizer particles with a solution of the coating substance and thereafter evaporating the solvent used to prepare the solution. The first method wherein melted material is used can only be utilized where the melting or softening point of the coating material is below the decomposition temperature of nitronium perchlorate. In general, it will be found that it is best to employ a solution of the polymer or wax. Halogenated or nitrated organic liquids are preferred as solvents because they do not react with NPC at ambient temperature.

The resins and waxes used to protect the nitronium perchlorate may generically be described as hydrocarbons or hydrocarbon backbone substances; that is to say, they have carbon to carbon bonds along the principal chain. Some of the polymers may contain combined halogen atoms, especially chlorine and fluorine, that have been substituted for part or all of hydrogen atoms attached to the carbon chain, e.g. polyvinyl chloride and the copolymer of hexafluoropropylene and vinylidene fluoride. The softening or melting point of the resin or wax should be substantially above room temperature and preferably is at least 50° C. Most of the useful organic coating materials have softening points (ball and ring method) between about 60° and 200° C. and/or intrinsic viscosities of 0.2 to 4 or 5.

One method of coating small discrete particles of nitronium perchlorate with a melted or liquefied wax or low molecular weight resin is to tumble the oxidizer particles in the organic coating substance at a temperature below the decomposition temperature of the oxidizer for a sufficient time to cover the particles with a coating which is at least 0.5 mil but not more than 10 mils thick. It has been found that coatings which are about 1 to 3 mils thick are particularly satisfactory for the purposes of the present invention because the coating is heavy enough to protect the particle yet not so thick as to interfere with the high energy characteristics of the oxidizer. Since the organic coatings have a relatively low fuel value, it is essential to avoid applying too thick a layer of the coating substance on the particles since excessive amounts will significantly reduce the specific impulse of the final propellant. Generally, it is advisable to use less than 10 wt. percent of such coating substances, based on the total weight of the coated oxidizer, where the oxidizer is intended for use in a high energy propellant. If the coated nitronium perchlorate is to be incorporated in a very high energy propellant the organic coating substance should comprise not more than 5 wt. percent of the oxidizer.

After the oxidizer particles have been tumbled or mixed with the melted organic coating substance for from a few seconds to 10 or 15 minutes at an elevated temperature which is below 100° C., e.g. 35 to 90° C., the coated particles are separated from the mixture by means of gravity separation or other recovery techniques known in the coating art. It is suggested that the coated particles recovered from the mixture be agitated or tumbled in a suitable manner until the coating is sufficiently dry or hardened so that the particles do not tend to adhere to one another. The particles of course should be dried at a temperature which is below the melting or softening point of the coating substance. For instance tumbling the coated particles in a rotating vessel maintained at temperatures of 15 to 25° C. for about 1 to 30 minutes will bring about a satisfactory hardness of the coating.

Since there are only a few substances, e.g. waxes, which have appropriate softening points for the above-described method, another method of coating the oxidizer particles can be employed where the above-described process cannot be employed. In this process the organic coating substance is dissolved in a suitable inert solvent and the resulting solution is used to coat the particles of NPC. For example, a ½ to 50 wt. percent solution of resin or wax is sprayed on small discrete particles of NPC which preferably are tumbling in a dry nitrogen stream. This coating technique is quite rapid and a suitable coating may be obtained in a short time, e.g. 1 second to 10 minutes. The preferred coating temperature is one which is substantially below the decomposition temperature of the oxidizer, yet not less than 0° C., e.g. 10 to 50° C. The coated particles recovered from the coating zone should be tumbled or agitated while being dried in order to avoid the formation of lumps. For instance, they may be tumbled in a rotating vessel and simultaneously blown with a dry gas such as air or nitrogen to assist in the removal of the solvent. The drying temperature may be above room temperature where the pressure is atmospheric or lower than the aforementioned temperature where reduced pressure is employed.

Among the inert solvents which may be used in the preparation of the coating solution are carbon tetrachloride, chloroform, nitromethane, tetranitromethane, and similar solvents. Some of these solvents have a slight solubility for NPC and should be saturated with NPC before use. In general the most suitable solvents are the low molecular weight liquid halogenated and nitrated hydrocarbons. While inert liquids containing up to 10 carbon atoms per molecule may be used, the preferred carbon range for the solvent is 1 to 6. The low molecular weight, highly volatile inert solvents are particularly useful because they are easily evaporated or otherwise removed during the drying step.

Still another method for coating the stable NPC used herein is the vapor deposition process wherein an inorganic substance is sublimed or decomposed and the vapor formed is deposited on the surface of the particles. The sublimation or decomposition of the inorganic coating material is carried out at a temperature which is well below the decomposition temperature of the oxidizer. The vaporization and coating steps should be done at reduced pressures approximating a vacuum, that is below 1 micron of mercury absolute pressure and at temperatures below room temperature. The preferred coating temperature in this process is about −10 to −35° C. These low temperatures are required because NCP has appreciable vapor pressure even at 0° C. If the vapor pressure of the coated substance is over 1 micron, adherent metal coatings are not obtained.

In the sublimation process, a film of metal having a boiling point between about 500 and 2800° C., preferably between 1000 and 2100° C., is sublimed at about −20° C. under less than 1 micron of mercury absolute pressure in a suitable vessel such as a crucible. The sublimed metal is condensed on particles of nitronium perchlorate which are continuously agitated on a vibrating table containing cooling coils. The coils may contain a cold brine solution or a mixture of acetone and dry ice at about −40° C. When the particles have a coating of sufficient thickness they are removed from the condensing zone and new particles are introduced into the zone to take their place. This coating process may take from 10 seconds to 30 minutes and usually results in the formation of particles having metal coatings that are 0.01 to 2 mils in thickness. The preferred thickness is between about 0.1 and 0.5 mil.

The vapor deposition or vapor plating process permits the use of high energy fuels, such as aluminum, in the coating operation. This feature has particular importance in the case of high energy rocket propellants wherein the quantity of low fuel value material is critical. Of course, care must be taken not to exceed the stoichiometric amount of fuel needed to react with the oxidizer since the unreacted fuel would merely add weight to the propellant. This is not usually a problem since it is generally necessary to employ additional fuel to react with the excess oxidizer. As mentioned above, the metal used to coat the NPC should have a boiling point below 2800° C. and preferably below 2100° C. It should not only be vaporizable but preferably it should also have the additional property of being an excellent fuel. The metals employed in this embodiment of the invention are preferably selected from Groups I–A, II–A, III–A and IV–B of the Periodic Chart of Elements shown on pages 56–57 of Lange's Handbook of Chemistry, 8th edition. Among the metals which may be used in the present process are lithium, magnesium, beryllium, boron and especially aluminum. In addition to aluminum, beryllium and boron are the preferred metal coating substances.

The thermal decomposition process is carried out in a similar manner to that described above. For instance, organometallics, such as organoaluminums, organoboron compounds, organotitanium, etc. may be decomposed to release the metal which in turn coats the nitronium perchlorate particles which may have average diameters of 25 to 500 microns.

In another embodiment of the invention the nitronium perchlorate is first coated with an organic substance in a manner as described above and then a thin coating of metal, such as aluminum, is applied to the coated particle via the vapor deposition process. The advantages of this method are that there are no cracks in the coating, the particles have a better shape, the coating adheres better to the particles and higher temperatures can be used in the vapor plating processes because the sublimation pressure of NPC is reduced.

The coated nitronium perchlorate is readily compounded with the other conventional ingredients of a rocket propellant and pressed or extruded into a grain of a particular design. The finished propellant may be a solid cylindrical mass or it may comprise a cylindrical shaped body having a star-shaped or circular conduit passing through its center along the longitudinal axis. While the coated particles of the present invention have special application to solid rocket propellants often employed in pure rockets, it also may be used in hybrid liquid-solid propellant systems.

The amount of fuel, oxidizer and binder used in formulating the propellant will of course vary according to the particular needs. Generally speaking, it is between about 10 and 40 wt. percent and 3 and 20 wt. percent binder, with the balance being occupied by the oxidizer which in this case is nitronium perchlorate. A suitable high energy rocket propellant may comprise 30 wt. percent aluminum, 10 wt. percent binder and 60 wt. percent coated nitronium perchlorate. The binder may be any suitable substance such as steam-cracked petroleum resins, isopreneisobutylene butyl rubber, natural rubber, polyurethane, polynitrourethane or double base which is a 1:1 mixture of nitrocellulose and nitroglycerine.

The following examples illustrate how the present invention may be carried out:

EXAMPLE 1

Chlorine dioxide was continuously introduced into one end of a glass tubular reactor where it contacts ozonized air obtained from a Welsbach ozonizer operating at 60 cycles and 100 volts at 25° C. The chlorine dioxide used in the synthesis was prepared by the dropwise addition of a 10 wt. percent solution of sulfuric acid to an aqueous solution of sodium chlorite and was dried by bubbling it through sulfuric acid and then passing it over three traps containing phosphorous pentoxide. The flow rate of the ozonized air was approximately 0.03 cu. ft./min., while the flow rate of the chlorine dioxide is adjusted so as to just avoid discoloration of the product. The reaction zone was at about 25° C. and under a pressure of 2 inches of concentrated sulfuric acid (density 1.84 gm./cc.) throughout the reaction. At the end of 6 hours it was noted that 1.490 grams of nitronium perchlorate had formed the tubular reactor. The NPC in the reactor had an acid equivalent weight of 72.6 and contained 9.84% nitrogen, as determined by the Kjeldahl method.

The nitronium perchlorate product recovered above is coated with a thermoplastic copolymer of vinylidene chlorideacrylonitrile (Saran F–120), having a viscosity of 200 cps. at 25° C. as a 20% solution in methylethyl ketone and a softening point of 90° C., by spraying NPC particles having an average diameter of 1 mm. with a saturated chloroform solution at ambient temperature while tumbling the particles in a stream of dry nitrogen. The polymer solution is dried with phosphorous pentoxide and saturated with NPC prior to use. The dried coated particles contain 5 wt. percent polymer which is equivalent to a coating 1 mil thick.

The coating process described above is repeated with stable NPC having an average particle size of 3.5 mm. The thickness of the coating is about 3 mils thick.

The coated NPC can be stored for relatively long periods of time and may be admixed with substances which do not penetrate the coating but that would otherwise react with uncoated NPC. The particles are much less sensitive to impact than NPC made in a liquid medium (100 kg. in. vs. 5–20 kg. in.).

EXAMPLE 2

Stable NPC can also be prepared by using chlorine oxide which is made from chlorine and ozone just prior to reacting it with nitrogen tetroxide. This avoids handling chlorine dioxide which is unstable and it has the added advantage of making the chlorine oxide from basic raw materials, namely chlorine and oxygen.

A stream of oxygen is fed into a Welsbach ozonizer at the rate of 0.03 cu. ft./min. The ozonizer is operated at 60 cycles × 100 volts and results in the formation of 3.6 mg. of $O_3$/min. To this mixed oxygen-ozone stream is added dry chlorine at about 8 cc./min. The mixed gases are irradiated in a flow system for about a minute with a 100 watt Hanovia quartz U.V. lamp. To this irradiated gas mixture is added nitrogen tetroxide at such a rate that the reaction flask has a brownish appearance, but so that no nitrogen-tetroxide is lost in the effluent stream. After about 3 hours 260 mg. of a white material is obtained that is analyzed for nitronium perchlorate: calculated—acid equivalent weight 72.8; percent Cl 24.4; found—acid equivalent weight 71; percent Cl 24.7.

NPC recovered from the above-described process is coated with aluminum via the vapor deposition process. Molten aluminum in a ceramic crucible, is evaporated in an evacuated chamber at less than 1 micron of mercury absolute pressure. The continuously sublimed metal vapors are reflected onto the NPC particles in another section of said chamber that is at the same low pressure and which contains particles of nitronium perchlorate having an average particle size of 100 microns on a cooled vibrating table containing coils filled with acetone and Dry Ice at —40° C. The vaporized metal is permitted to condense on the surface of the moving particles so that an even coating about 2 mils thick is deposited on the particles. The particles are exposed to the vaporized aluminum metal for about 5 minutes, after which time they are withdrawn from the condensation chamber and compounded according to the following recipe to produce a high energy solid rocket propellant.

EXAMPLE 3

The particles coated with polymer in accordance with Example 1 are coated with aluminum as described in Example 2. These particles are highly stable and can be compounded with hydrazine, lithium, aluminum hydride and other reactive chemicals.

It is not intended to restrict the present invention to the foregoing examples which are merely given to demonstrate some of the embodiments of the invention. It should only be limited to the appended claims in which it is intended to claim all of the novelty inherent in the invention as well as the modifications and equivalents coming within the scope and spirit of the invention.

What is claimed is:

1. Nitronium perchlorate having a moisture impervious coating about 0.01 mil to 10 mils thick of a substance unreactive with the nitronium perchlorate and selected from the group consisting of lithium, magnesium, beryllium, boron, aluminum, polyvinyl chloride, thermoplastic copolymer of vinylidene chloride-acrylonitrile, copolymer of hexafluoropropylene-vinylidene fluoride, paraffin wax, polyethylene and polypropylene, said nitronium perchlorate being essentially free of water and perchloric acid.

2. Nitronium perchlorate particles having a moisture impervious layer 1 to 3 mils thick of a high molecular weight organic coating substance unreactive with the nitronium perchlorate and selected from the group consisting of polyvinyl chloride, thermoplastic copolymer of vinylidene chloride-acrylonitrile, copolymer of hexafluoropropylene-vinylidene fluoride, paraffin wax, polyethylene and polypropylene, said nitronium perchlorate particles being essentially free of water and of perchloric acid, said coating being less than 10 wt. percent of the total weight of the nitronium perchlorate with its coating.

3. Nitronium perchlorate particles having a moisture impervious metal coating about 0.01 mil to 2 mils in thickness, the metal being selected from the group consisting of lithium, magnesium, beryllium, boron, and aluminum, said nitronium perchlorate being essentially free of water and perchloric acid.

4. Nitronium perchlorate having a moisture impervious coating of an inner layer of a high molecular weight organic substance unreactive with nitronium perchlorate, said organic substance being selected from the group consisting of polyvinyl chloride, thermoplastic copolymer of vinylidene chloride-acrylonitrile, copolymer of hexafluoropropylene-vinylidene fluoride, paraffin wax, polyethylene and polypropylene, and an outer layer of a metal unreactive with nitronium perchlorate selected from the group consisting of lithium, magnesium, beryllium, boron, and aluminum, said inner and outer layers making a coating not more than 10 mils thick, said nitronium perchlorate being essentially free of water and of perchloric acid.

5. Method of preparing stabilized nitronium perchlorate which comprises applying under anhydrous conditions at below 100° C. in a few seconds to about 10 minutes to nitronium perchlorate particles having a decomposition temperature of about 120° C. and which are free of water and of perchloric acid, a liquid surface coating of a high molecular weight organic substance unreactive with the nitronium perchlorate, said organic substance being selected from the group consisting of polyvinyl chloride, thermoplastic copolymer of vinylidene chloride-acrylonitrile, copolymer of hexafluoropropylene-vinylidene fluoride, paraffin wax, polyethylene and polypropylene, then hardening the coating at low temperatures up to about 25° C. for about 1 to 30 minutes to form a hardened, moisture impervious coating layer of the high molecular weight organic substance applied in an amount to make the coating layer about 1 to 3 mils thick.

6. The method as in claim 5 in which the high molecular weight organic substance is the copolymer of vinylidene chloride-acrylonitrile dissolved in a liquid solvent that does not react with the nitronium perchlorate under the conditions of applying the liquid solution to the nitronium perchlorate by spraying, after which the solution coating is dried to form the hardened coating layer.

7. The method as in claim 5 in which an outer coating layer of aluminum about 0.1 mil to 2 mils thick is applied to the hardened coating layer of the high molecular weight organic substance by vaporizing the aluminum below room temperature to less than one micron of mercury absolute pressure, and condensing the vaporized aluminum onto the hardened coating layer of the high molecular weight organic substance.

8. Method of preparing stabilized nitronium perchlorate which comprises vaporizing a metal selected from the group consisting of lithium, magnesium, beryllium, boron, aluminum, at a temperature below room temperature, condensing the resulting vaporized metal on the surface of nitronium perchlorate particles essentially free of water and of perchloric acid at a temperature below room temperature until a coating of about 0.01 mil to 2 mils in thickness of the metal is formed on said particles.

9. In a rocket propellant comprising about 10 to 40 wt. percent fuel, 3 to 20 wt. percent binder, and a balanced proportion of nitronium perchlorate an oxidizer, said nitronium perchlorate being stabilized and having a moisture impervious coating of 0.01 mil to 10 mils thick of a substance unreactive with the nitronium perchlorate selected from the group consisting of lithium, magnesium, beryllium, boron, aluminum, polyvinyl chloride, thermoplastic copolymer of vinylidene chloride-acrylonitrile, copolymer of hexafluoropropylene vinylidene fluoride, paraffin wax polyethylene and polypropylene, said nitronium perchlorate being essentially free of water and of perchloric acid.

10. In a rocket propellant as defined in claim 9, said nitronium perchlorate having a coating layer of aluminum about 0.01 mil to 2 mils in thickness.

11. Nitronium perchlorate having a moisture impervious coating of aluminum, said coating being 0.01 mil to 2 mils of thickness, and said nitronium perchlorate being essentially free of water and of perchloric acid.

12. Stabilized nitronium perchlorate consisting essentially of nitronium perchlorate having a 1 to 3 mil thick coating of thermoplastic copolymer of vinylidene chloride-acrylonitrile, said nitronium perchlorate being essentially free of water and of perchloric acid.

13. Stabilized nitronium perchlorate defined in claim 21 having an outer layer coating of aluminum 0.01 mil to 2 mils thick on the copolymer coating.

14. Stabilized nitronium perchlorate consisting essentially of nitronium perchlorate having a coating of polypropylene about 1 to 3 mils in thickness, said nitronium perchlorate being essentially free of water and of perchloric acid.

References Cited

UNITED STATES PATENTS

| | | |
|---|---|---|
| 2,930,767 | 3/1960 | Novak. |
| 2,155,499 | 4/1939 | Lawson _____ 52—19 |
| 1,310,037 | 5/1916 | Snelling. |
| 1,692,996 | 11/1928 | Richardson et al. |

BENJAMIN R. PADGETT, Primary Examiner

U.S. Cl. X.R.

117—100; 149—4, 5, 19, 22, 42, 75